Patented Sept. 23, 1941

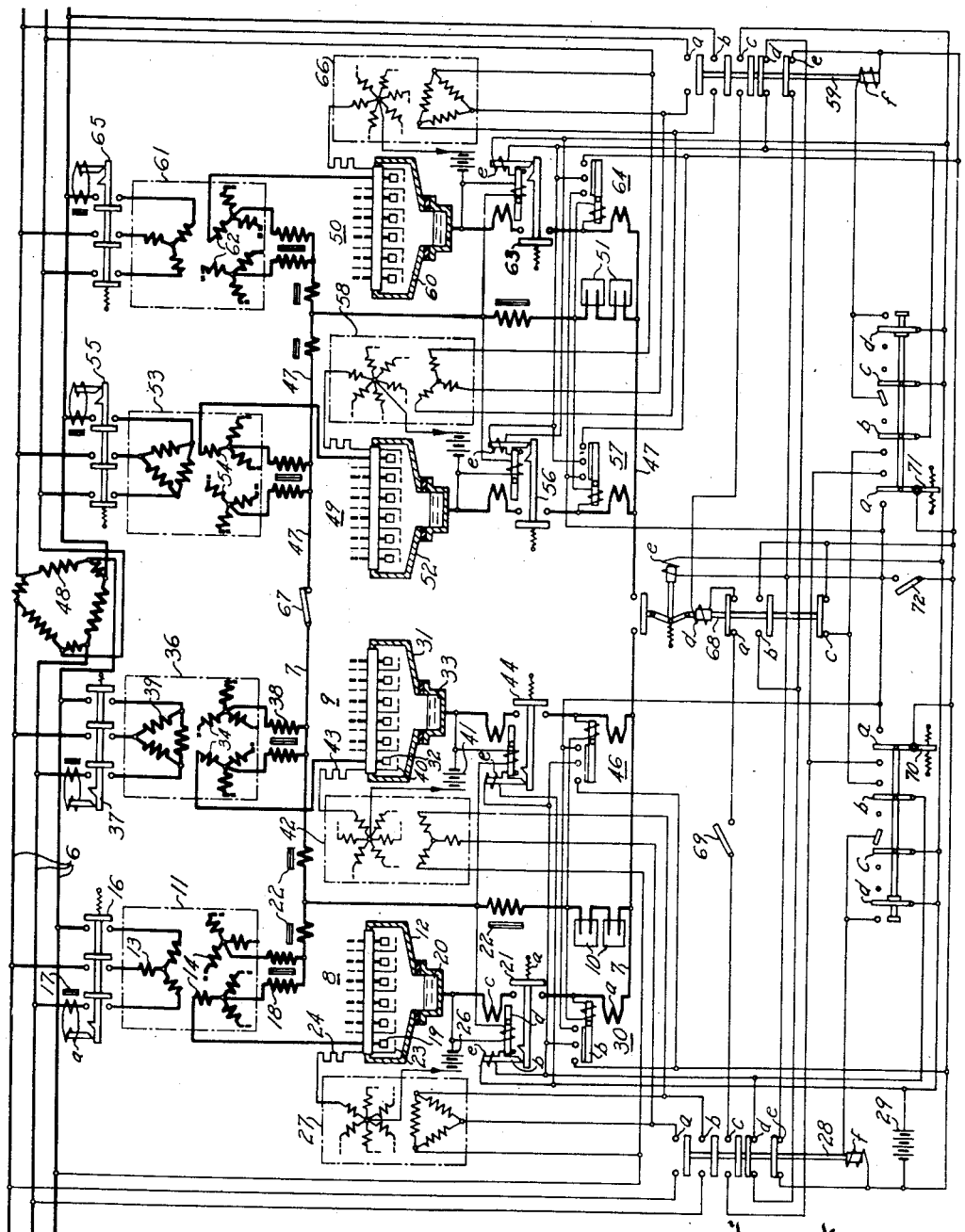

2,256,755

UNITED STATES PATENT OFFICE 2,256,755

ELECTRIC VALVE CONTROL SYSTEM

Harold Winograd, Milwaukee, Wis., assignor to Allis-Chalmers Manufacturing Company, Milwaukee, Wis., a corporation of Delaware Application June 28, 1940, Serial No. 342,851

17 Claims. (Cl. 171—97)

This invention relates in general to improvements in electric valve control systems and more particularly to means for preventing overloading of an electric current converter of the electric valve type as a result of changes in the operating condition of another converter connected in parallel therewith.

The supply of direct current of high intensity for electro-chemical processes is now generally effected through electric current converting systems of the electric valve type. The amount of energy involved then frequently becomes so large that the current required for a plant cannot be supplied by a single converter, so that a plurality of converters are connected in parallel between the supply circuit and the load circuit. For example, metallic aluminum is now obtained in series connected electrolytic cells requiring current reaching 50,000 amperes, which may be obtained from a battery of ten parallel converters each capable of delivering current of 5,000 amperes. It is then impractical to control the current flowing through the cells by means of a single circuit breaker connected in series therewith because the size and weight of the moving parts of the circuit breaker reach such magnitudes as to render the operation thereof unreliable.

It is therefore preferable to control the individual converter currents either by means of control electrodes of the valves or of a plurality of circuit breakers each controlling the flow of current through one of the converters. Initiation of the flow of current simultaneously through the different converters is preferably effected by common means rendering the valves of the different converters conductive simultaneously.

If the valves of the different converters operate during different periods, as is generally the case in practice, it is undesirable to interrupt the flow of current through the converters by rendering the valves non-conductive. The reason therefor is that if it is attempted to render all the valves of a converter non-conductive, the last valve to carry current continues to remain in operation until the voltage impressed between the anode and cathode thereof is reversed. This voltage reversal takes place sequentially in the different converters so that the converters become inoperative in sequence. When all the converters except one have become inoperative, one valve or one group of parallel valves of the last converter to operate momentarily carries the entire load current of the system, which may be ten times the maximum normal current of one converter in the example considered above. The inductance of the load circuit may cause this current to continue to flow during a period reaching easily ten times the length of a normal period of current flow through a valve, thereby overloading the valve or group of valves to the point of injury or even of possible destruction.

Interruption of the flow of current through the converters is therefore preferably effected by simultaneously opening the circuit breakers severally controlling the flow of current through the different converters and only thereafter rendering the valves of the converters non-conductive to permit subsequent reclosure of the circuit breakers.

Several load circuits of the type above considered may also be connected in parallel to obtain a uniform distribution of the flow of current through the converters connected with all the load circuits, even when the load circuits are carrying currents of different values or when one of the converters is temporarily disconnected from the associated load circuit. The control circuits for the different groups of converters are then preferably interlocked with the switching means interconnecting the load circuits to cause disconnection of any load circuit when the converters associated therewith are rendered inoperative, and to render inoperative only the converters of one of the load circuits upon occurrence of a permanent disturbance in one of such converters.

It is therefore one object of the present invention to provide a control system for a plurality of parallel current converters of the electric valve type for insuring simultaneous initiation of the flow of current through the converters to a common load circuit.

Another object of the present invention is to provide a control system for a plurality of parallel current converters of the electric valve type for preventing overloading of one of the converters while another of the converters is being disconnected from a common load circuit.

Another object of the present invention is to provide a control system for a plurality of parallel current converters of the electric valve type for preventing overloading of one of the converters when the load circuits associated with different groups of converters are connected in parallel.

Another object of the present invention is to provide a control system for a plurality of parallel current converters of the electric valve type for causing all the converters to become inoperative when a permanent abnormal operating condition takes place in one of the converters.

Objects and advantages other than those above described will be apparent from the following description, when read in connection with the accompanying drawing, which diagrammatically illustrates one embodiment of the present invention applied to the control of two groups of converters severally associated with two parallel load circuits.

Referring more particularly to the drawing by characters of reference, reference numeral 6 designates a polyphase alternating current circuit to be connected with a direct current circuit 7 through a plurality of parallel converters 8, 9 of the electric valve type. The flow of energy through the converters may take place in either direction, but it will be assumed that current is being transmitted therethrough from circuit 6 to circuit 7. Circuit 6 is therefore a supply circuit connected with a suitable current generator (not shown) and circuit 7 is a load circuit connected with current consuming devices of high capacity, such as electrolytic cells 10. Although the advantages of the present invention increase with the number of converters connected in parallel, only two converters are shown connected with circuit 7 to simplify the drawing and the description thereof.

Converter 8 comprises a main transformer 11 and a plurality of electric valves generally designated by 12. Transformer 11 comprises a primary winding 13 and a secondary winding 14. Winding 13 is connected with circuit 6 through a switch 16 provided with a trip coil 16a connected with a current transformer 17 inserted in one of the connections of winding 13 with circuit 6. Winding 14 is connected in star and is preferably divided into two groups of phase portions defining two neutral points severally connected with the negative conductor of circuit 7 through an interphase transformer 18.

Valves 12 are severally provided with anodes 19 which are preferably arranged within a common casing, the cathodes of the valves then being combined into a common cathode structure 20. Suitable means (not shown) are provided for bringing cathode 20 into electron emitting condition and for maintaining the cathode in such condition, as is well known. Anodes 19 are severally connected with the phase portions of winding 14, and cathode 20 is connected with the positive conductor of circuit 7 through a switch 21 provided for controlling the flow of current through converter 8. Switches 16, 21 may also be replaced by a single multipole switch inserted in the connections between winding 14 and anodes 19 as is well known. The connections of winding 14 and cathode 20 with cells 10, including a portion of circuit 7, are usually of such length as to present a material amount of inductance which may be assumed to be localized in an inductive reactor 22.

The conductivity of valves 12 is controlled by means of control electrodes 23 severally associated with anodes 19 and which may be variably energized to vary the operation of converter 8. Each control electrode 23 is connected with cathode 20 through a circuit comprising a current limiting resistor 24 and a source of negative potential such as a battery 26 serving to maintain the valves non-conductive. To render the converter operative, valves 12 are rendered conductive by means of a transformer 27 having a secondary winding divided into phase portions severally inserted into the control electrode circuits. The primary winding of transformer 27 is energized from circuit 6 through contacts 28a, 28b of a relay 28.

Switch 21 may be closed in any desired manner and is held closed against the action of an opening spring 21a by means of a latch 21b. The switch is arranged to open upon occurrence of an operating condition of converter 8, such as a reverse flow of current through cathode 20, by means of a series trip coil 21c acting on a polarized armature 21d adapted to withdraw latch 21b. This arrangement is designed to respond within the shortest possible time. The latch may also be withdrawn by energizing a shunt trip coil 21e.

Coil 21e may be connected with a battery 29 through contacts of a reverse current relay 30 comprising a coil 30a serially connected with cathode 20 and acting on a polarized armature 30b. Relay 30 is designed to respond to the flow of reverse current through coil 30a with a very short time delay to cause the relay to operate only if switch 21 fails to open.

Converter 9 is similar to converter 8 and comprises a second plurality of electric valves 31 provided with anodes 32 and a cathode 33. Anodes 32 are severally connected with the phase portions of secondary winding 34 of a second main transformer 36 energized from circuit 6 through a switch 37 similar to switch 16. Winding 34 is preferably similar to winding 14 and is connected with circuit 7 through an interphase transformer 38. The primary windings 13, 39 of transformers 11 and 36 are, however, different from each other to cause the terminal voltages of winding 34 to be displaced in phase with respect to the terminal voltages of winding 14, whereby the voltages of windings 14 and 34 jointly form a polyphase system of voltages.

The conductivity of valves 31 is controlled by means of control electrodes 40 each connected with cathode 33 through a battery 41, one of the secondary winding phase portions of a transformer 42 and a current limiting resistor 43. Transformers 27 and 42 are so arranged that the secondary voltages thereof are in the same phase relation as the voltages of windings 14 and 34 to cause valves 31 to operate in the same manner as valves 12. Cathode 33 is connected with circuit 7 through a second switch 44 for controlling the flow of current through converter 9. Switch 44 is provided with a polarized tripping mechanism similar to that of switch 21 and with a shunt trip coil 44e connected in parallel with trip coil 21e. A second polarized relay 46 responsive to reverse flow of current through cathode 33 is provided with contacts connected in parallel with the contacts of relay 30.

Circuit 6 may be connected with a second load circuit 47 through a phase shifter 48 and through a plurality of parallel converters 49, 50. Circuit 47 is connected with load devices such as electrolytic cells 51 similar to cells 10. Converter 49 is identical to converter 9 and likewise comprises a plurality of electric valves 52 and a transformer 53 energized through a switch 55 and having a secondary winding 54. The flow of current through converter 49 may be interrupted by means of a switch 56 provided with a trip coil 56e adapted to be connected with battery 29 through the contacts of a polarized relay 57. The conductivity of valves 52 may be controlled by means comprising a transformer 58 energized from circuit 6 through phase shifter 48 and through the contacts 59a, 59b of a relay 59.

Converter 50 is identical to converter 8 and likewise comprises a plurality of electric valves 60 and a transformer 61 energized through a switch 65 and having a secondary winding 62. The flow of current through converter 50 may be controlled by means of a switch 63 provided with a trip coil 63e connected in parallel with trip coil 56e. The connection between switch 63 and circuit 47 comprises a polarized relay 64 provided with contacts connected in parallel with the contacts of relay 57. The conductivity of valves 60 may be controlled by means comprising a transformer 66 connected with phase shifter 48 through contacts 59a, 59b of relay 59.

The voltages of windings 54 and 62 form a system of polyphase voltages similar to the system of voltages of windings 14, 34. By reason of the connection of transformers 53, 61 with circuit 6 through phase shifter 48, however, the voltages of windings 54, 62 are displaced in phase with respect to the voltages of windings 14, 34 and the voltages of the four windings jointly form another polyphase system of voltages.

Circuit 47 may be connected in parallel with circuit 7 by means of switches 67, 68. Switch 68 is provided with a plurality of auxiliary contacts 68a to 68c. The closing coil 68d of switch 68 may be connected with battery 29 through contacts 28c, 68a and 59c and through a switch 69. Switch 68 is accordingly interlocked with switches 28, 59 and is caused to close in response to the operation thereof. Contacts 68b control the connections of battery 29 with coils 21e, 44e through contacts 28d, and with coils 56e, 63e through contacts 59d.

Switches 21, 44 and switches 56, 63 may selectively be caused to open by means of a pair of control switches 70, 71 and of contacts 68c of switch 68. Switch 70 is provided with a plurality of contacts movable into two control positions and tending to return to the rest position shown. One of the contacts 70a of switch 70 controls the connection of trip coil 68e with battery 29. Trip coil 68e may also be energized from battery 29 through a switch 72, through contacts 28e, contacts 59e, or contacts of relays 30, 46, 57 and 64. Another contact 70b controls the connection of coils 21e, 44e with battery 29 through contacts 68c. Switch 70 is further provided with contacts 70c, 70d for connecting coil 28f with battery 29. Switch 71 is identical to switch 70 and is connected similarly thereto for controlling the operation of the switches 56, 63 and of relay 59.

In operation, the system being connected as shown on the drawing and circuit 6 being energized, the supply of current to circuit 7 may be initiated by a sequence of operations commencing with rendering cathodes 20 and 33 emissive in a known manner. The load represented by cells 10 may be assumed to require the full output of converters 8, 9 and of any other converters connected in parallel therewith, so that if a converter were operatively connected alone with circuit 7, the converter would be severely overloaded. The flow of current should therefore be initiated simultaneously through all the parallel converters connecting circuit 6 with circuit 7.

For this purpose, switches 21, 44, 16 and 37 are first closed to complete the connections of the converters with circuits 6 and 7. The control electrodes of valves 12, 31 are then maintained at a negative potential with respect to the cathode potential by means of batteries 26, 41. As a result thereof the valves are rendered nonconductive for the flow of current therethrough. Switch 70 may thereafter momentarily be moved to the left to close contact 70d. Contact 70d is a so-called slip contact which remains closed when switch 70 is returned to the position shown.

Closure of contact 70d connects coil 28f with battery 29 and relay 28 closes contacts 28a, 28b, 28c and opens contacts 28d, 28e. Transformers 27 and 42 are thereby simultaneously connected with circuit 6 and therefore simultaneously become operative. Transformer 27 immediately impresses a positive potential on at least one control electrode 23 associated with an anode 19 receiving a positive potential from winding 14, thereby releasing the flow of current through such anode. At the same time, transformer 42 impresses a positive potential on at least one control electrode 40 associated with an anode 32 receiving a positive potential from winding 34 to release the flow of current therethrough. Operation of relay 28 thus immediately causes a valve of each converter to be rendered conductive so that the flow of current is initiated simultaneously through the two converters and neither converter becomes overloaded.

After the initiation of the flow of current through the converters, the different valves 12 operate in sequence and carry current during predetermined periods depending on the phase relation of transformers 11 and 27 and on the voltage of battery 26, as is well known. Valves 31 operate during predetermined periods different from the operating periods of valves 12 depending on the phase relation of transformers 36 and 42 and on the voltage of battery 41. Because of non-coincidence of the operating periods of valves 12 and 31, it is not desirable to interrupt the flow of current between circuits 6 and 7 by returning relay 28 to the position shown. This procedure would cause the total current of cells 10 to continue to flow through either a single valve 12 or a single valve 31 during a length of time depending on the inductance of circuit 7.

To interrupt the flow of current simultaneously through converters 8 and 9, switch 70 is moved toward the right. During this movement of the switch, contact 70c first closes to maintain coil 28f energized, and contact 70d is thereafter returned from the closed position previously reached to the position shown. Finally, contact 70b closes a circuit from battery 29 through contacts 68c, contact 70b and coils 21e, 44e in parallel back to the battery. Switches 21 and 44 open simultaneously, thereby preventing any overloading of either converter until complete interruption of the flow of current between circuit 6 and 7. Switch 70 may then be allowed to return to the position shown. Contact 70c opens and, as contact 70d was already in the position shown, coil 28f is deenergized. Relay 28 returns to the position shown to disconnect transformers 27 and 42 from circuit 6 and thereby render valves 12, 31 non-conductive.

While converters 8, 9 are connected with circuit 7 to supply current thereto, if it is desired also to transmit current from circuit 6 to circuit 47, the cathodes of valves 52, 60 are rendered emissive, switches 56, 63, 55 and 65 are closed and switch 69 may also be closed. Switch 71 is then moved toward the right, whereby relay 59 is caused to operate to render converters 49, 50 operative in the manner above described with respect to converters 8, 9. Upon operation of relay 59, a circuit is completed from battery 29 through contacts 71a, 28c, switch 69, contacts 68a, closing coil 68d, and contacts 59c back to the battery. Switch 68 is closed by the closing coil and is maintained closed by a latch (not shown) provided therefor. Converters 8, 9, 49, 50 then operate in parallel to supply current jointly to circuits 7, 47. As a result of the connection of transformers 53, 61 with circuit 6 through phase shifter 48, valves 52, 60 operate during predetermined periods different from the operating periods of valves 12, 31.

During parallel operation of all converters, if a disturbance such as a backfire occurs in one of valves 12, for example, converters 9, 49 and 50 cause a direct current to flow through the series coil of relay 30, switch 21, coil 21c and cathode 20 to the backfiring anode 19 in the direction opposite to the normal direction of flow. The flow of this current through coil 21c causes armature 21d to withdraw latch 21b with the result that switch 21 is opened by spring 21a. Switch 21 interrupts the flow of current through cathode 20, thereby precluding operation of relay 30. At the same time an abnormally high current is supplied from circuit 6 to transformer 11 as a result of the backfire. This current, flowing through current transformer 17, causes sufficient current to be supplied to the trip coil of switch 16 to trip the switch, which disconnects transformer 11 from circuit 6. Converters 9, 49 and 50 remain in operation and jointly continue to supply current to circuits 7, 47.

If switch 21 fails to open in response to the reverse flow of current through coil 21c, relay 30 closes the contacts thereof after a short time delay in response to the same reverse flow of current. Relay 30 connects coils 21e, 44e and 68e with battery 29, thereby causing switches 44 and 68 to open even if switch 21 still fails to open. Opening of switches 44, 68 completely interrupts the flow of reverse current to cathode 20 as well as the normal flow of current to cells 10, and converters 49, 50 continue to supply current to circuit 47 in the normal manner thereof.

When switch 68 is closed and all the converters are in operation, failure of the coil of relay 28 or of relay 59 results in the converters controlled by the faulty relay being rendered non-conductive. Switch 68 should then be opened to prevent overloading of the converters remaining operative. If coil 28f fails, for example, relay 28 returns to the position shown. Switch 68 then being assumed closed, coils 21e, 44e are connected with battery 29 through contacts 28d and 68b. Coil 68e is connected with the battery through contacts 28e. Switches 21, 44 and 68 open simultaneously, thereby leaving converters 49, 50 connected with circuit 47 to the exclusion of circuit 7.

During parallel operation of all converters, switches 21, 44 may be selectively opened independently of switches 56, 63 by movement of switch 70 to the right. Contact 70a then closes to connect trip coil 68e with battery 29. The trip coil causes the toggle of switch 68 to collapse and the switch opens. Contacts 68c are closed in response to opening of switch 68 to cause opening of switches 21, 44 in the manner above described. Switch 70 may then be returned to the position shown to open contact 70c and thereby render valves 12, 31 inoperative. Converters 49, 50 then remain alone in operation to supply current from circuit 6 to circuit 47. If it is desired instead to maintain converters 8, 9 in operation, converters 49, 50 may likewise selectively be rendered inoperative by means of switch 71 in the manner above described with respect to converters 8, 9.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, a supply circuit, a load circuit, a current converter for connecting said supply circuit with said load circuit, means for rendering said current converter operative, a second load circuit, said load circuits being operable independently of each other, a second current converter for connecting said supply circuit with said second load circuit, means for rendering said second current converter operative, a switch for connecting said load circuits in parallel, and means interlocking said switch with the first and second said means.

2. In an electric translating system, a supply circuit, a load circuit, a current converter for connecting said supply circuit with said load circuit, means for rendering said current converter operative, a second load circuit, said load circuits being operable independently of each other, a second current converter for connecting said supply circuit with said second load circuit, means for rendering said second current converter operative, a switch for connecting said load circuits in parallel, and means responsive to operation of the first and second said means for closing said switch.

3. In an electric translating system, a supply circuit, a load circuit, a current converter comprising an electric valve for connecting said supply circuit with said load circuit, means for rendering said valve conductive, a second load circuit, said load circuits being operable independently of each other, a second current converter comprising a second electric valve for connecting said supply circuit with said second load circuit, means for rendering said second valve conductive, a switch for connecting said load circuits in parallel, and means responsive to operation of the first and second said means for closing said switch.

4. In an electric translating system, a supply circuit, a load circuit, a current converter for connecting said supply circuit with said load circuit, a first switch for controlling the flow of current through said converter, a second load circuit, said load circuits being operable independently of each other, a second current converter for connecting said supply circuit with said second load circuit, a second switch for connecting said load circuits in parallel, and means for causing opening of said first switch comprising means for causing opening of said second switch and means responsive to opening of said second switch.

5. In an electric translating system, a supply circuit, a load circuit, a current converter for connecting said supply circuit with said load circuit, a first switch for controlling the flow of current through said converter, a second load circuit, said load circuits being operable independently of each other, a second current converter for connecting said supply circuit with said second load circuit, a second switch for controlling the flow of current through said second converter, a third switch for connecting said load circuits in parallel, and means for selectively causing opening of said first and second switches comprising means for causing opening of said third switch and means responsive to opening of said third switch.

6. In an electric translating system, a supply circuit, a load circuit, a current converter comprising an electric valve for connecting said supply circuit with said load circuit, a first switch for controlling the flow of current through said converter, means for rendering said valve conductive, a second load circuit, a second current converter for connecting said supply circuit with said second load circuit, a second switch for connecting said load circuits in parallel, means for rendering the first said current converter inoperative comprising a control switch movable into a control position and tending to return to a rest position, means responsive to movement of said control switch into said control position for causing opening of said second switch, means responsive to opening of said second switch for causing opening of said first switch, and means responsive to return of said control switch into said rest position for rendering the first said means inoperative.

7. In an electric translating system, an alternating current circuit, a direct current circuit, a first current converter for connecting said alternating current circuit with said direct current circuit comprising a plurality of electric valves operating during predetermined periods, a first switch for controlling the flow of current through said converter, means for rendering said valves conductive, a second current converter connected in parallel with said first converter and comprising a second plurality of electric valves operating during periods different from the first said periods, a second switch for controlling the flow of current through said second converter, means for rendering the second said valves conductive, and means for interrupting the flow of current between said circuits comprising means for causing said first and second switches to open simultaneously and for thereafter rendering the first and second said means inoperative.

8. In an electric translating system, an alternating current circuit, a direct current circuit, a first current converter for connecting said alternating current circuit with said direct current circuit comprising a plurality of electric valves operating during predetermined periods, a first switch for controlling the flow of current through said converter, means for rendering said valves conductive, a second current converter connected in parallel with said first converter and comprising a second plurality of electric valves operating during periods different from the first said periods, a second switch for controlling the flow of current through said second converter, means for rendering the second said valves conductive, and means for initiating the operation of said converters comprising means for causing closure of the first and second said switches and for thereafter causing the first and second said means to become operative simultaneously.

9. In an electric translating system, a supply circuit, a load circuit, a current converter for connecting said supply circuit with said load circuit, a first switch for controlling the flow of current through said converter, a second load circuit, a second current converter for connecting said supply circuit with said second load circuit, a second switch for connecting said load circuits in parallel, means responsive to an operating condition of the first said converter for causing opening of said first switch, and time delay means responsive to said operating condition for causing opening of said second switch.

10. In an electric translating system, an alternating current circuit, a direct current circuit, a first current converter for connecting said alternating current circuit with said direct current circuit comprising a plurality of electric valves operating during predetermined periods, a first switch for controlling the flow of current through said converter, a second current converter connected in parallel with said first converter and comprising a second plurality of electric valves operating during periods different from the first said periods, a second switch for controlling the flow of current through said second converter, and means for interrupting the flow of current between said circuits comprising means for causing simultaneous opening of said first and second switches.

11. In an electric translating system, an alternating current circuit, a direct current circuit, a first current converter for connecting said alternating current circuit with said direct current circuit comprising a plurality of electric valves operating during predetermined periods, means for rendering said valves conductive, a second current converter connected in parallel with said first converter and comprising a second plurality of electric valves oeprating during periods different from the first said periods, means for rendering the second said valves conductive, and means for initiating the operation of said converters comprising means for causing the first and second said means to become operative simultaneously.

12. The method of interrupting the flow of current simultaneously through a plurality of parallel electric current converters of the electric valve type comprising the steps of simultaneously opening the circuits of said converters and of thereafter rendering the valves of the different converters non-conductive.

13. The method of initiating the flow of current simultaneously through a plurality of parallel electric current converters of the electric valve type comprising the steps of closing the circuits of said converters and of thereafter rendering a valve of each converter simultaneously conductive.

14. In an electric translating system, a supply circuit, a load circuit, a first current converter for connecting said supply circuit with said load circuit, a first switch for controlling the flow of current through said converter, a second current converter for connecting said supply circuit with said load circuit, a second switch for controlling the flow of current through said second converter, a second load circuit, a third converter for connecting said supply circuit with said second load circuit, a third switch for connecting said load circuits in parallel, means responsive to an operating condition of said first converter for causing opening of said first switch, and time delay means responsive to said operating condition for causing opening of said second and third switches.

15. In an electric translating system, a supply circuit, a load circuit, a first current converter for connecting said supply circuit with said load circuit, a first switch for controlling the flow of current through said converter, a second load circuit, said load circuits being operable independently of each other, a second current converter for connecting said supply circuit with said second load circuit, a second switch for connecting said load circuits in parallel, and means responsive to an operating condition of said first converter for causing simultaneous opening of said first and second switches.

16. In an electric translating system, a supply circuit, a load circuit, a first current converter for connecting said supply circuit with said load circuit, a first switch for controlling the flow of current through said converter, a second load circuit, a second current converter for connecting said supply circuit with said second load circuit, a second switch for connecting said load circuits in parallel, and means for causing opening of said first switch in response to an operating condition of said first converter when said second switch is closed comprising an element of said second switch.

17. The method of controlling the flow of current through a plurality of parallel electric current converters of the electric valve type comprising the steps of simultaneously opening the circuits of said converters, rendering the valves of the different converters non-conductive, reclosing the circuits of said converters while said valves are maintained non-conductive, and rendering a valve of each converter simultaneously conductive.

HAROLD WINOGRAD.

DISCLAIMER 2,256,755.—*Harold Winograd*, Milwaukee, Wis. ELECTRIC VALVE CONTROL SYSTEM. Patent dated September 23, 1941. Disclaimer filed February 19, 1943, by the assignee, *Allis-Chalmers Manufacturing Company*.

Hereby enters this disclaimer to claims 8, 11, 13, and 17 in said specification.

[*Official Gazette March 16, 1943.*]